United States Patent
Ott (10) Patent No.: US 6,671,802 B1
(45) Date of Patent: *Dec. 30, 2003

(54) PERFORMANCE OPTIMIZATION OF COMPUTER SYSTEM BY DYNAMICALLY AND IMMEDIATELY UPDATING A CONFIGURATION SETTING BASED ON DETECTED CHANGE IN PREFERRED USE

(75) Inventor: Donna E. Ott, Ft Collins, CO (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/549,140

(22) Filed: Apr. 13, 2000

(51) Int. Cl.[7] .................................. G06F 1/24
(52) U.S. Cl. ..................................... 713/100
(58) Field of Search ............... 713/100, 1; 717/173

(56) References Cited

U.S. PATENT DOCUMENTS

| | | | | |
|---|---|---|---|---|
| 5,444,642 A | * | 8/1995 | Montgomery et al. | 702/91 |
| 5,809,282 A | * | 9/1998 | Cooper et al. | 709/226 |
| 5,822,565 A | * | 10/1998 | DeRosa et al. | 703/24 |
| 5,944,819 A | * | 8/1999 | Kumar et al. | 713/1 |
| 6,059,842 A | * | 5/2000 | Dumarot et al. | 717/153 |
| 6,167,567 A | * | 12/2000 | Chiles et al. | 717/173 |
| 6,262,730 B1 | * | 7/2001 | Horvitz et al. | 345/707 |
| 6,263,382 B1 | * | 7/2001 | Bartlett et al. | 710/10 |
| 6,339,826 B2 | * | 1/2002 | Hayes et al. | 713/166 |
| 6,446,203 B1 | * | 9/2002 | Aguilar et al. | 713/2 |
| 6,462,759 B1 | * | 10/2002 | Kurtzberg et al. | 345/803 |

* cited by examiner

*Primary Examiner*—Thomas Lee
*Assistant Examiner*—Albert Wang (57) ABSTRACT

An apparatus and method for optimizing the performance of a computer system based on the preferred use of the computer system are described. Upon an indication by the user of the computer system of the primary role, i.e., a file server or a desk top publisher, etc., which the computer is to play, the inventive performance optimization process, which may be implemented as the hardware abstraction layer (HAL) of the operating system (OS), detects the indicated use preference, and updates the system BIOS settings and/or configuration register settings of any other firmware throughout the computer system to optimize the entire computer system for the indicated use of the computer system. A tuning table that maps the use preference to the optimal configuration settings of the BIOS and/or the firmware may be stored in a non-volatile memory for a fast and convenient performance optimization. The optimal configuration settings may be determined empirically for a continuous enhancement of the optimization scheme. The enhancement upgrade of the tuning table may be downloaded from a remote server.

20 Claims, 7 Drawing Sheets

| | I/O Controller/Bridge | | Cache Controller | Memory Controller | |
|---|---|---|---|---|---|
| OPTIMIZATION PARAMETER | Queue Size | DMA Enable | Page Replacement Strategy | Page Size | Map/Allocation Scheme |
| Selection 1  00 | 000 | 1 | 00 | 010 | 0101 |
| Selection 2  01 | 111 | 1 | 01 | 100 | 1010 |
| Selection 3  10 | 101 | 0 | 10 | 110 | 1100 |
| Selection 4  11 | 010 | 0 | 11 | 111 | 0011 |

PERFORMANCE OPTIMIZATION OF COMPUTER SYSTEM BY DYNAMICALLY AND IMMEDIATELY UPDATING A CONFIGURATION SETTING BASED ON DETECTED CHANGE IN PREFERRED USE

TECHNICAL FIELD

The invention relates to computers and processor systems. More particularly, the invention relates to performance optimization of a computer system by tuning the system hardware setting based on the usage of the computer system.

BACKGROUND ART

Most modem computers, e.g., a personal computer (PC), are constructed with general functionality so that they may run many different applications. Most of the modem computers also allow a variation in configuration settings in order to optimize the performance of the computer for the particular applications for which the computer is intended to be used. However, a particular configuration setting of the computer may not be the optimal setting for every possible application in which the computer system may be used. For example, the same computer optimized for use as a desk-top application workstation, e.g., by allocating a large application area in the memory, may not necessarily be optimally "tuned" to be used as, e.g., a network file server, which requires a larger buffer area to increase the throughput of file transfers. Accordingly, any attempts to optimize the performance of a modem computer must take into account the particular intended use of the computer.

Figure 5:
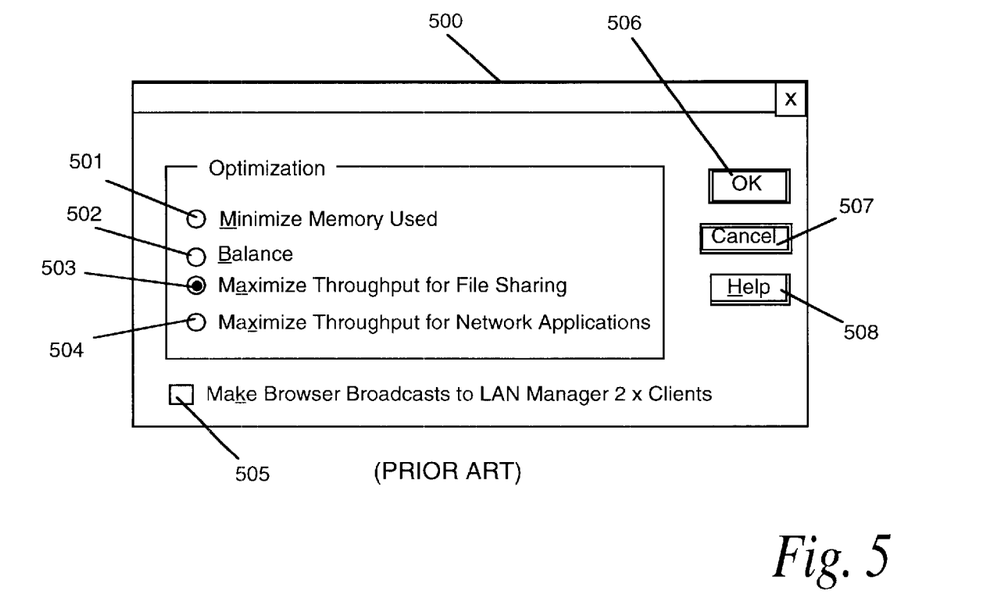
FIG. 5 an exemplary menu screen of a conventional operating system (OS) for optimization parameter selection.

To this end, some conventional modem operating systems (OS), e.g., the WINDOWS NT®, distributed by the Microsoft Corporation in Redmont, Washington, allow a user to make a performance tuning selection based on the desired use of the computer. In particular, for example, FIG. 5 shows a menu screen 500 of the WINDOWS NT®, from which such user selection can be made. The menu 500 allows a user to select one of four available use feature options, namely, the "Minimize Memory Used" option 501, the "Balance" option 502, the "Maximize Throughput for File Sharing" option 503 and the "Maximize Throughput for Network Applications" option 504.

Each of the four options particularly optimizes the behavior of the operating system for a specific use. For instance, when the "Minimize memory Used" option 501 is chosen, the operating system uses a minimal amount memory for handling network-based requests, thus optimizing the computer for running many foreground applications while servicing a limited number of network requests. A computer so configured may be best suited, for example, primarily as an application work station.

The other choices, the "Balance" option 502, the "Maximize Throughput for File Sharing" option 503 and the "Maximize Throughput for Network Applications" option 504 may optimize the computer to serve the role of, e.g., a Domain Controller, a file server, and a database server, respectively.

Additionally, the menu 500 allows a user to cancel an erroneously made selection by pressing the "cancel" button 507, or seek help in making the selection by pressing on the "help" button 508. Once the final selection is made, i.e., when the "OK" button 506 is pressed, the operating system stores the user selection as an optimization parameter for future reference by the operating system.

Unfortunately, however, in a conventional computer system, the optimization parameters are stored in a location known only to the operating system, and are thus not available for use by the rest of the computer system, e.g., the Basic Input Output System (BIOS) and the other system software and/or hardware components (collectively referred to herein as the firmware components). Therefore, in a conventional computer system, the changes made in response to the indicated user preference is disadvantageously limited to the optimization of the decision making process of the operating system, e.g., in determining how it uses the available resources such as the memory and the like. Accordingly, conventional operating system based optimization is only partially effective, since it fails to optimize the entire system.

Moreover, in a conventional computer system, because the conventional optimization process is integrally incorporated in the kernels of the operating system, any improvement in the optimization algorithm itself, e.g., an improved configuration setting corresponding to a particular intended use, cannot be implemented without the release of a new version of the operating system. Thus, a user is required to wait for the new release of the operating system before receiving the benefit of any improvement in optimization.

Furthermore, because the operating system must be re-initialized before it can use the newly stored user selection information, the entire computer system must be re-booted before any optimization can take effect. Thus, the optimization process is disadvantageously static.

There is thus a need for an apparatus and method for computer system performance optimization that allows optimization of the entire system, including the hardware settings as well as the software settings according to the user indication of a preferred use of the computer system. There is also a need for an apparatus and method for computer system performance optimization that may be updated without the need for a new release of the entire operating system. There is a further need for an apparatus and method for a dynamic computer system performance optimization.

Among the objectives of the present invention is to allow a user of a computer system to optimally configure the system hardware and/or software settings for the preferred intended use of the computer system.

Another objective of the present invention is to allow a dynamic optimization of a computer system based on the intended use.

Yet another objective of the present invention is to allow an update of an optimization scheme without a modification or an update of the operating system. Other objectives are met by the invention described in the claims herein.

SUMMARY OF INVENTION

In accordance with the principles of the present invention, a method of optimizing the performance of a computer system, comprises detecting a modification of the use preference of the computer system, and updating a configuration setting of either a system BIOS or a firmware component of the computer system based on the detected modification of the use preference.

In addition, in accordance with the principles of the present invention, an apparatus for optimizing performance of a computer system comprises a modification detector which detects a modification of a use preference of the computer system, and a hardware optimizer that updates a configuration setting of either a system BIOS or a firmware component of the computer system based on the detected modification of the use preference.

Furthermore, in accordance with the principles of the present invention, a hardware abstraction layer (HAL) of an operating system of a computer system comprises a modification detector that detects a modification of a use preference of the computer system, and a hardware optimizer that updates a configuration setting of either a system BIOS or a firmware component of the computer system based on the detected modification of the use preference.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring primarily to a computer system with WINDOWS NT® as an exemplary operating system (OS). However, one of ordinary skill in the art would readily recognize that the same principles are equally applicable to, and can be implemented in, any computer system with any other suitable operating systems (OS).

Moreover, throughout the following description, the setting of server optimization options (as described above in connection with the description of FIG. 5, and as is implemented in the WINDOWS NT®) is used as an example of the user indication of the use preference of the computer system. However, any other possible use of the computer system other than ones listed in the exemplary menu screen of FIG. 5, e.g., a use of the computer system in a non-server application, i.e., as a workstation, may be selected by the user, and would be apparent to one of ordinary skill in the art, and would be within such modifications that do not depart from the true spirit and scope of the present invention.

Figure 7:
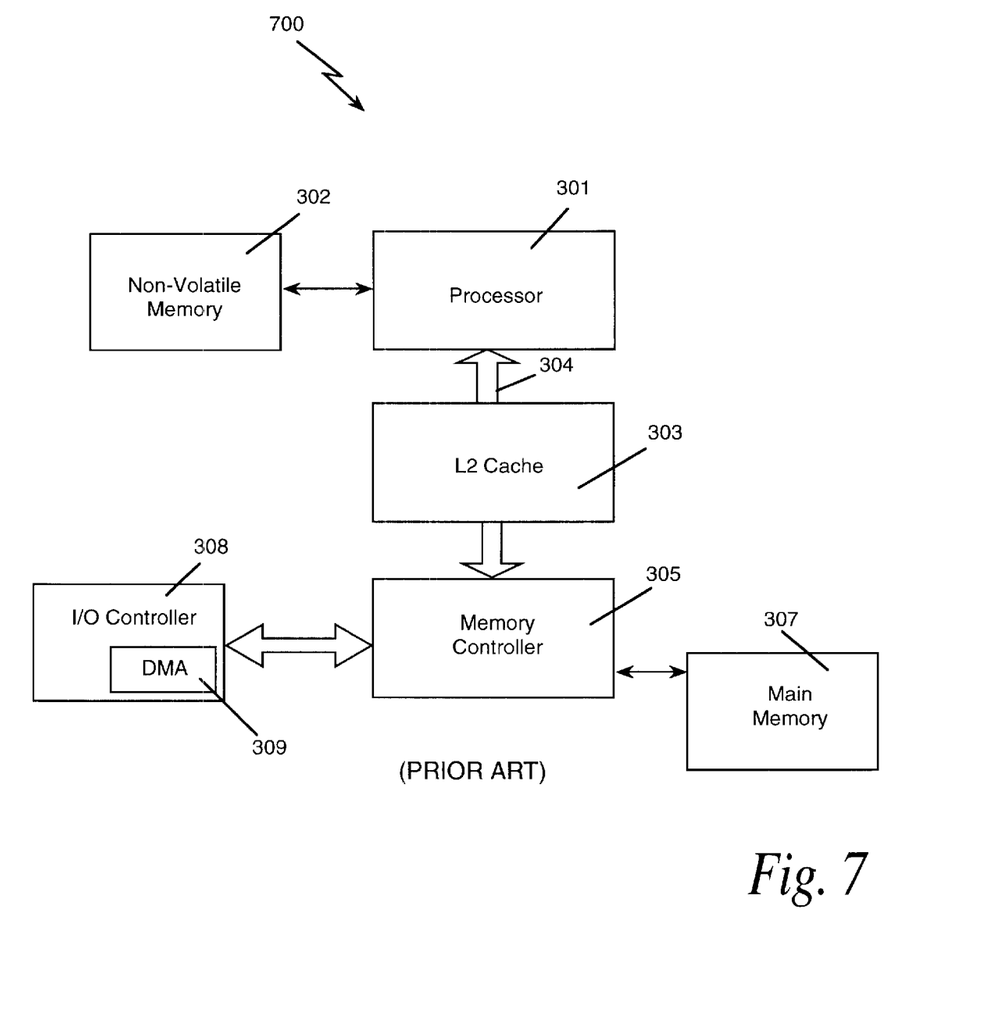
FIG. 7 is a block diagram of the relevant portions of a conventional computer system.

A typical computer system 700 shown in FIG. 7 comprises, inter alia, a processor 301 for executing one or more instructions retrieved through the bus 304 from the main memory 307, which is being controlled by the memory controller 305. A more likely to be used portion of the instructions (and/or data) from the main memory 307 may be copied over to the cache memory 303 to take advantage of the faster speed (as compared to the main memory 307) in which the cache memory can be accessed by the processor 301.

The computer system 700 may further comprise an I/O controller 308 for controlling one or more input/output (I/O) devices (not shown), which may include, e.g., a keyboard, disk drives, graphics devices, network interfaces, and the like. The I/O controller may include a direct memory access (DMA) handler 309, which allows the direct exchange of data between the I/0 devices and the main memory without the need for an involvement of the processor 301.

The processor 301, the memory controller 305 and the I/O controller 308 collectively are commonly referred to as the system chipset. Each device of the chipset typically includes a set of registers (not shown) in which the configuration setting information is stored. The configuration setting information of each of the chipset devices defines a set of choices, within many possible choices, with regard to the specific way in which the device is to behave while performing its intended function. The configuration setting information may be retrieved from the non-volatile memory 302 during the initial boot-up of the computer system 700.

Additionally, the computer system 700 may comprise a non-volatile memory 302, which is commonly referred to as the Complementary Metal Oxide Semiconductor memory or the CMOS memory, and is typically a small low power consumption random access memory (RAM) powered by a battery to retain the data even when the system power is turned-off. The term, non-volatile memory, as used herein refers to any memory that retains the data stored therein even when the system power is turned off, and may be, e.g., a non-volatile random access memory (NVRAM), a flash memory, an electrically erasable programmable read only memory ( EEPROM) or the like.

The non-volaile memory 302 stores the system settings information required by the basic input output system (BIOS) during the initial boot process of the computer system 700. The non-volatile memory 302 also has stored therein housekeeping information and program routines, e.g., the pointers for the interrupt service routines, required and used by the operating system (OS).

Figure 6:
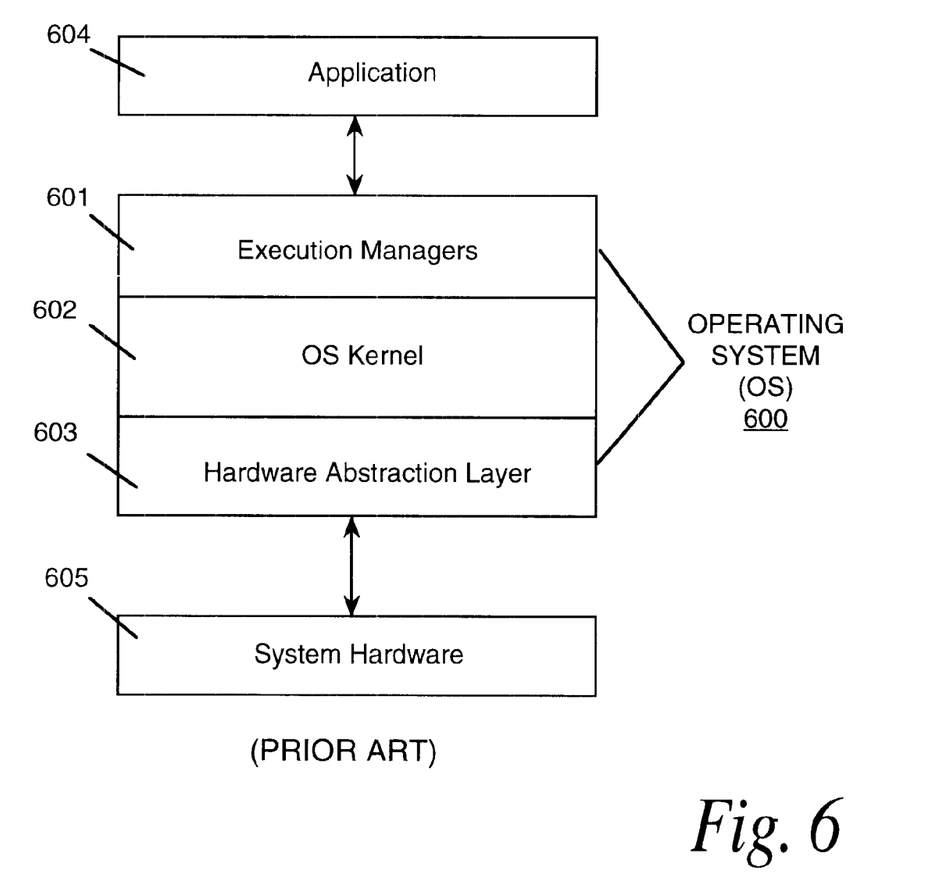
FIG. 6 is a block diagram of the relevant portions of a conventional operating system (OS).

An operating system (OS) 600 shown in FIG. 6, e.g., the WINDOWS NT®, typically comprises an execution manager layer 601, which may include various managerial routines, e.g., object manager, virtual memory manager, etc., to handle various tasks that effectively act as the interface between the kernel 602, which is the core set of codes or the operating system 600, and the application programs 604. The kernel 602 and the execution manager layer 601 collectively are commonly referred to as the executive services.

The operating system 600 further comprises the hardware abstraction layer (HAL) 603, which acts as the interface to the system hardware 605. The HAL 603 isolates the executive service of the operating system 600 from the system hardware 605 in such a way that the executive service is hardware-independent. That is, the executive service can be made to remain the same regardless of any variations of the hardware 605. The system hardware 605 includes the physical hardware devices and the necessary software for the control of the hardware devices, e.g., the device drivers, which are collectively referred to herein as the firmware.

In a conventional computer system, the information regarding the use preference indicated by the user, e.g., via the menu screen shown in FIG. 5, is stored in a location known only to the executive service portion of the operating system (OS) for the exclusive use by the executive service. Thus, the HAL 603 of a conventional operating system is unaware of any change in the use preference, and cannot be involved in the performance optimization effort. As a result no changes are made to the firmware components 605 despite the change in the use preference.

The performance optimization system in accordance with the principle of the present invention detects any change in the use preference information, and makes the information available to the system BIOS, the firmware components and/or the hardware abstraction layer of the computer system.

Figure 1:
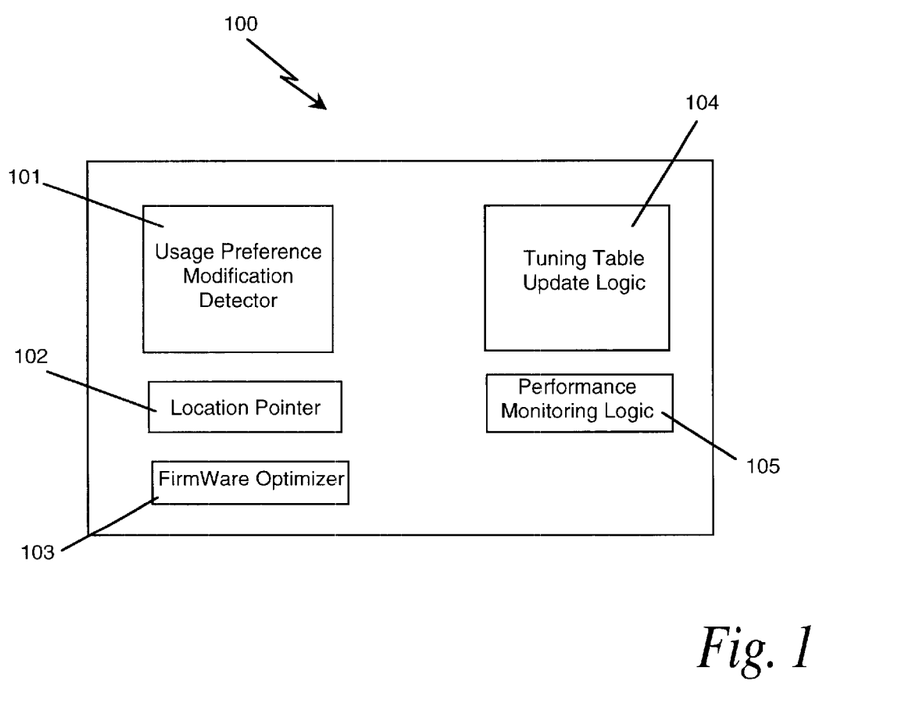
FIG. 1 is a block diagram of an exemplary embodiment of the performance optimization components in accordance with the principles of the present invention.
Figure 2:
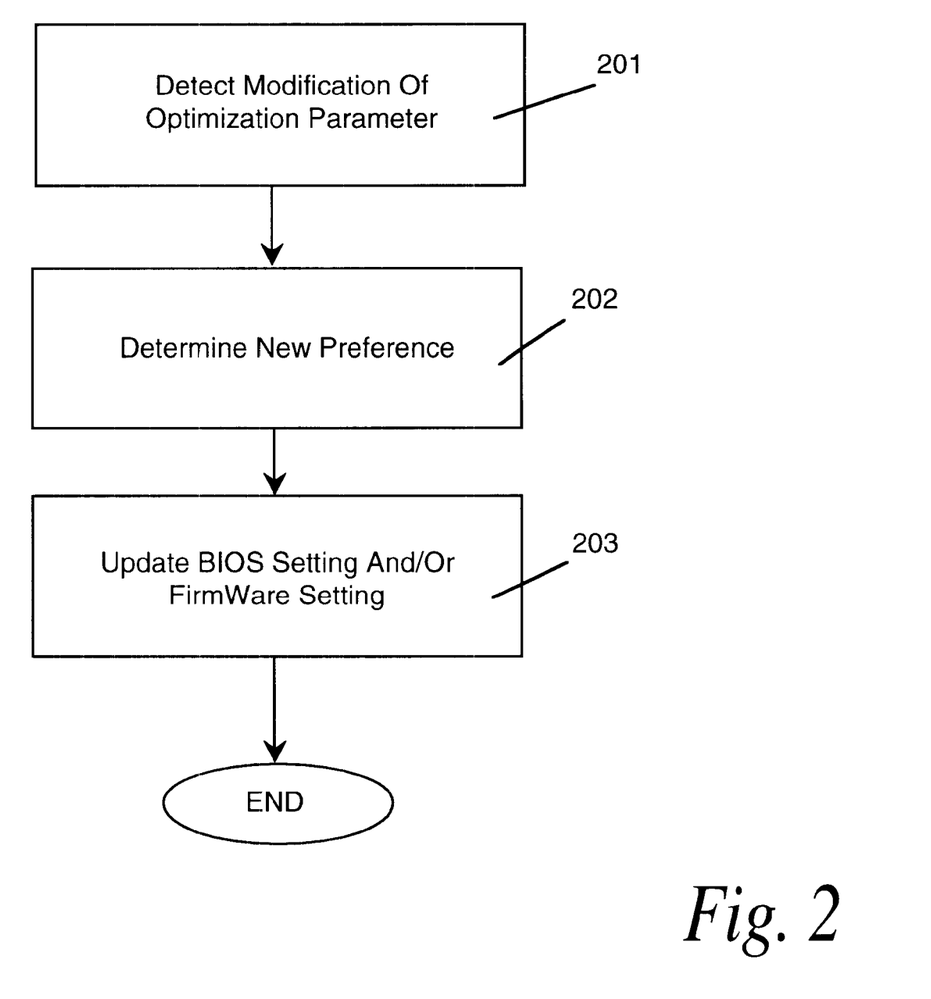
FIG. 2 is an exemplary flow diagram of the performance optimization method in accordance with the principles of the present invention.

In particular, FIG. 1 shows a block diagram of an exemplary embodiment of the performance optimization system 100 in accordance with the principles of the present invention. An exemplary flow diagram of the performance optimization method in accordance with the principles of the present invention is shown in FIG. 2.

The performance optimization system 100 may be implemented as a software, for example, an application program and/or preferably as components of the hardware abstraction layer (HAL) of the operating system (OS), or as a circuit logic device, or any combination thereof, implementing the optimization process in the foregoing description. In addition, the performance optimization system, in accordance with the principles of the present invention, may include components other than those, and may not necessarily include all components, shown in the exemplary embodiment of FIG. 1.

The performance optimization system 100 may include the use preference modification detector 101. In step 201 of FIG. 2, the modification detector 101 detects any modification of the use preference being made, e.g., by polling the appropriate executive service portion of the operating system (OS). The detection may alternatively be made by "snooping" the appropriate address lines of the bus in order to monitor any access by the operating system of the address of the non-volatile memory location in which the use preference information is stored. Yet another way in which the detection may be made is to make the performance optimization system 100 receive a change notification signal and/or message from the executive services of the operating system upon a newly made selection by the user, and reading the new use preference information from the non-volatile memory location in which the use preference information is stored. The address of the non-volatile memory location in which the use preference information is stored may be stored in the location pointer 102.

In one embodiment of the present invention, the performance optimization system 100 preferably keeps a copy of the present use preference information in a the non-volatile memory location separate from the location in which the executive services of the operating system stores the information. In one embodiment of the present invention, an additional non-volatile memory may even be added for storage of the copied use preference. The addresses of both locations are also kept in the location pointer 102. The modification detector 101 may periodically compare the contents of the two locations to determine if any change has been made.

In another embodiment of the present invention, the modification detector 101 may receive the new use preference information directly from the user, through a user interface, rather than through the operating system.

Figure 3:
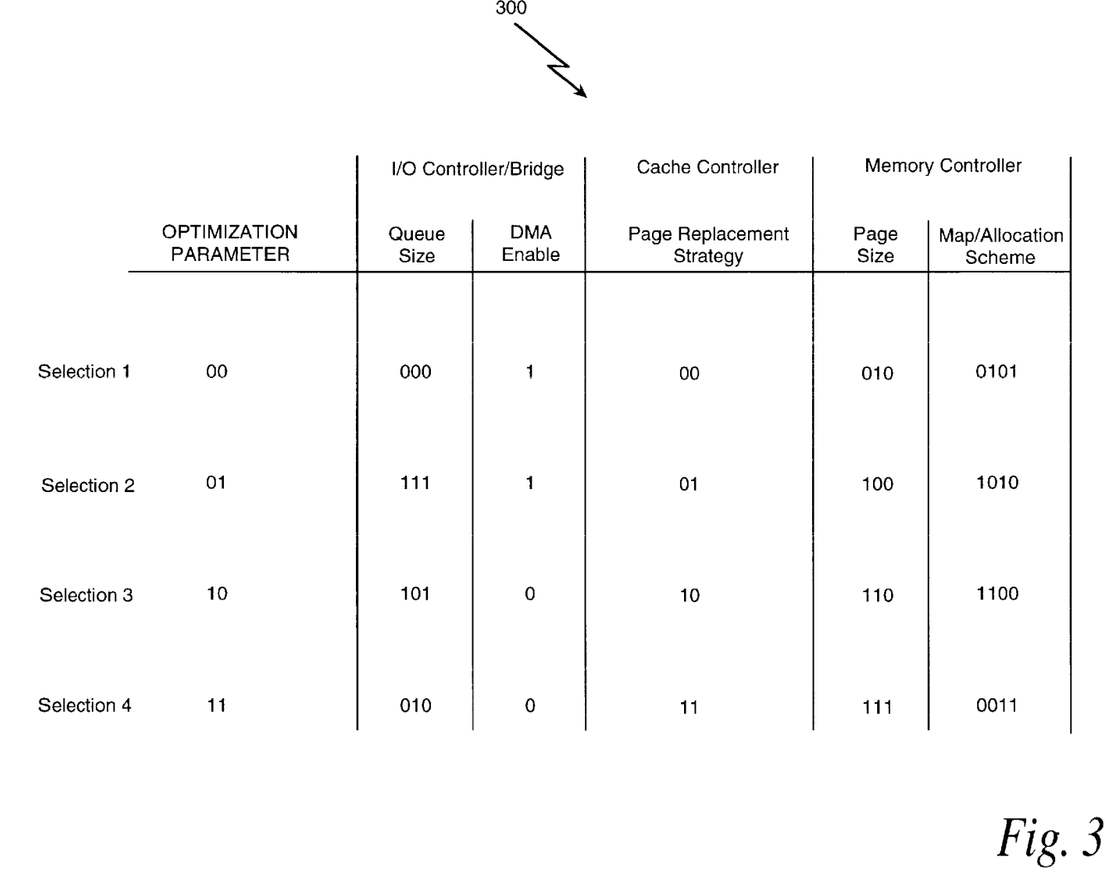
FIG. 3 is an exemplary tuning table in accordance with the principles of the present invention.

In step 202, once a modification has been detected by the modification detector 101, the performance optimization system 100 determines the corresponding changes, if any, in the BIOS setting and/or the configuration setting of the firmware components necessary to optimize the computer system for the newly selected preferred use. The new BIOS setting and/or the firmware configuration setting may preferably be made by looking-up a tuning table, an example of which is shown in FIG. 3.

The performance optimization system 100 may maintain, preferably in the non-volatile memory, a tuning table that defines the relational mapping between the user selected use preference and the corresponding optimal BIOS setting and/or the firmware configuration setting. In particular, as shown in FIG. 3, the tuning table 300 may include, as examples and not as a way of a limitation, one or more user selections, e.g., selections 1 through 4 corresponding to the selection choices shown in FIG. 5, and the configuration settings of the chipset devices, i.e., the I/O controller, the cache controller and the memory controller. The configuration setting of the I/O controller may include, e.g., inter alia, the disk queue size and whether the DMA handler is enabled. The configuration setting of the cache controller may include, e.g., inter alia, a selection from the available page replacement strategies, e.g., the least recently used (LRU) method. The configuration setting of the memory controller may include, e.g., inter alia, a selection of the page size, the memory map/allocation information. The configuration setting entries in the tuning table 300 may preferably determined empirically, e.g., from an analysis of the historical use/performance data.

In step 203, once the new configuration settings of the firmware components are determined, e.g., from the tuning table 300, the performance optimization system 100, if necessary, may replace the appropriate BIOS system setting and/or write into the appropriate configuration setting registers of the firmware to thereby optimally re-configure the firmware components of the computer system for the particular use preference.

In contrast to changes to the executive services of the operating system, the changes to contents of the configuration registers of the firmware components take effect immediately and without the need for a re-booting of the computer system. Thus, it can be appreciated that the optimization of the firmware for the preferred use of the computer system may be made dynamically and immediately upon the writing of the respective configuration registers, without the need for re-booting of the computer system.

The performance optimization system 100 in accordance with the principles of the present invention may additionally include a tuning table update logic 104 to update the tuning table 300. The effectiveness of the optimization may be improved by, e.g., a determination of new, more effective values of the configuration setting entries of the tuning table. The new values may be, e.g., a result of a continued analysis of the historical use/performance data, i.e., from a determination that a new setting better optimizes the particular device in the particular use preference context.

Thus, it can be appreciated that the effectiveness of the optimization may be conveniently improved by merely updating the tuning table, and without the need for a replacement of the entire operating system with a newer release.

The updates to the tuning table may be supplied by the user through a user interface, e.g., a keyboard. Alternatively, the updates may be supplied from a remote server through a communication network. For example, one or more of the computer systems may be connected via a communication network, e.g., a local area network (LAN) or a wide area network (WAN), through the Ethernet connections, public switched telephone network (PSTN), the Internet or the like. The identical tuning table update information may be broadcasted, e.g., as a JAVA applet, by one of the computer systems of the network acting as the administrative network manager server to a plurality of computers connected to the network, which share the same use preference.

In a preferred embodiment of the inventive performance optimization system 100 further comprises a performance monitoring logic 105. The performance monitoring logic 105 continuously monitors the performance of the computer system, e.g., by continuously monitoring a predetermined set of measurement matrix parameter, e.g., the network throughput, the bandwidth utilization level, the memory and/or other system resource utilization level or the like.

Figure 4:
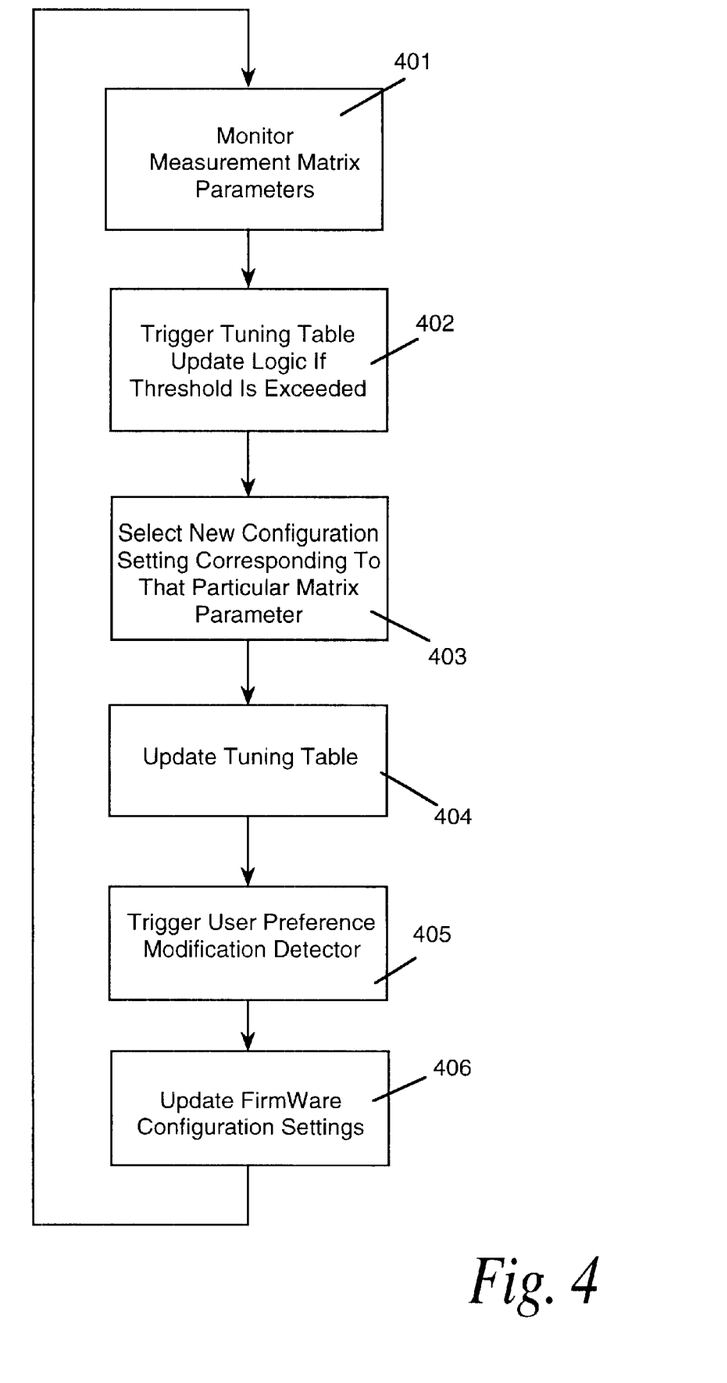
FIG. 4 is an exemplary flow chart of the continuous performance monitoring and optimization method in accordance with the principles of the present invention.

In particular, FIG. 4 shows a flow chart of an exemplary embodiment of the continuous performance monitoring and optimization method, during the step 401 of which, the performance monitoring logic 105 monitors one or more measurement matrix parameter to determine whether the performance of the computer system is at the optimal level. The optimal level of the performance of the computer may be defined, for example, by assigning a predetermined threshold level for the one or more matrix parameters below which the computer system may be considered at its optimum performance. The threshold levels may be set based on the use preference information, and preferably are incorporated in the tuning table 300.

When one or more threshold is exceeded, in step 402, the performance monitoring logic 105 notifies the tuning table update logic 104 with, e.g., information regarding which of one the threshold levels was exceeded. Based on the information received from the performance monitoring logic 105, the tuning table update logic 104, in step 403, determines a new configuration setting of a predetermined entry of the tuning table, and in step 404, changes the predetermined entry according to a predetermined algorithm.

In response to the change in the tuning table, the preference modification detector 101 is triggered in step 405. Once the preference modification detector 101 is triggered, in step 406, the firmware configuration setting is updated using the process previously described herein in connection with FIG. 2.

As can be appreciated, in this exemplary embodiment, the system firmware setting may be continuously, dynamically and autonomously optimized without the need for an external intervention or the need for a re-booting of the entire computer system.

While the invention has been described with reference to the exemplary embodiments thereof, those that are skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of optimizing performance of a computer system, comprising:
   detecting a modification of a use preference of said computer system when running an operating system, comprising:
   receiving a change notification signal from executive services of said computer system upon a newly made selection by a user; and
   dynamically and immediately updating a configuration setting of at least one of a system BIOS, a firmware component, and system hardware of said computer system based on said detected modification of said use preference without the need for re-booting of the computer system.

2. The method of optimizing performance of a computer system in accordance with claim 1, further comprising:
   making a copy of said use preference; and
   storing said copy of said use preference in a non-volatile memory.

3. The method of optimizing performance of a computer system in accordance with claim 2, further comprising:
   providing a tuning table in said non-volatile memory, said tuning table defined a relationship between said use preference and said configuration setting.

4. The method of optimizing performance of a computer system in accordance with claim 3, wherein:
   said relationship between said use preference and said configuration setting of said at least one of said system BIOS and said firmware component is defined empirically.

5. The method of optimizing performance of a computer system in accordance with claim 3, further comprising:
   updating said tuning table with a newly defined relationship between said use preference and said configuration setting.

6. The method of optimizing performance of a computer system in accordance with claim 5, wherein said step of updating said tuning table comprises:
   downloading said newly defined relationship from a remote server.

7. The method of optimizing performance of a computer system in accordance with claim 5, wherein said step of updating said tuning table comprises:
   receiving said newly defined relationship directly inputted by a user of said computer system.

8. The method of optimizing performance of a computer system in accordance with claim 5, wherein said step of updating said tuning table comprises:
   monitoring performance of said computer system;
   re-defining said relationship between said use preference and said configuration setting based on said monitored performance of said computer system to produce said newly defined relationship; and
   replacing said relationship between said use preference and said configuration setting with said newly defined relationship.

9. An apparatus for optimizing performance of a computer system, comprising:
   a modification detector adapted to detect, when running an operating system, a modification of a use preference of said computer system by receiving a change notification signal from executive services of said computer system upon a newly made selection by a user; and
   a firmware optimizer adapted to dynamically and immediately update a configuration setting of at least one of a system BIOS, a firmware component, and system hardware of said computer system based on said detected modification of said use preference.

10. The apparatus for optimizing performance of a computer system according to claim 9, further comprising:
    a non-volatile memory operable to store said use preference.

11. The apparatus for optimizing performance of a computer system according to claim 10, further comprising:
    a tuning table stored in said non-volatile memory, said tuning table defining a relationship between said use preference and said configuration setting.

12. The apparatus for optimizing performance of a computer system according to claim 11, further comprising:

communication means for downloading a newly defined relationship from a remote server, said newly defined relationship being an empirically determined enhancement of said relationship between said use preference and said configuration setting.

13. The apparatus for optimizing performance of a computer system according to claim 11, further comprising:

user input means for receiving a newly defined relationship directly inputted by a user of said computer system, said newly defined relationship being an empirically determined enhancement.

14. The apparatus for optimizing performance of a computer system according to claim 11, further comprising:

a performance monitoring logic for monitoring performance of said computer system; and a tuning table update logic for replacing said relationship between said use preference and said configuration setting with a newly defined relationship, said newly defined relationship being determined according to said monitored performance of said computer system.

15. The apparatus for optimizing performance of a computer system according to claim 9, wherein said configuration setting component of said computer system comprises:

a content of at least one register of a DMA handler of an I/O bridge device.

16. The apparatus for optimizing performance of a computer system according to claim 9, wherein said configuration setting of said computer system comprises:

a content of at least one register of a cache controller device.

17. The apparatus for optimizing performance of a computer system according to claim 9, wherein said configuration setting of said computer system comprises:

a content of at least one register of a memory controller device.

18. The apparatus for optimizing performance of a computer system according to claim 10, wherein said non-volatile memory comprises:

a non-volatile random access memory (NVRAM).

19. The apparatus for optimizing performance of a computer system according to claim 10, wherein said non-volatile memory comprises:

an EEPROM.

20. A hardware abstraction layer (HAL) of an operating system for a computer system, comprising:

a modification detector adapted to detect, when running an operating system, a modification of a use preference of said computer system by receiving a change notification signal from executive services of said computer system upon a newly made selection by a user; and a firmware optimizer adapted to dynamically and immediately update a configuration setting of at least one of a system BIOS, a firmware component, and system hardware of said computer system based on said detected modification of said use preference.

* * * * *

UNITED STATES PATENT AND TRADEMARK OFFICE
CERTIFICATE OF CORRECTION

PATENT NO. : 6,671,802 B1 Page 1 of 1
DATED : December 30, 2003
INVENTOR(S) : Donna E. Ott It is certified that error appears in the above-identified patent and that said Letters Patent is hereby corrected as shown below:

Title page,
Item [45], Date of Patent, delete "xwx.-99,-9999" and insert therefor -- Dec. 30, 2003 --

Signed and Sealed this

Fifth Day of April, 2005

JON W. DUDAS
*Director of the United States Patent and Trademark Office*